United States Patent [19]

Bely et al.

[11] 4,425,247

[45] Jan. 10, 1984

[54] COMPOSITE SELF-LUBRICATING MATERIAL

[76] Inventors: Vladimir A. Bely, ulitsa Kulmana, 15, kv. 6, Minsk; Anatoly I. Sviridenok, ulitsa Pushkina, 20, kv. 30, Gomel; Valentin G. Savkin, ulitsa 50 let BSSR, 15, kv. 6, Gomel; Vladimir V. Meshkov, ulitsa B. Tsarikova, 63, kv. 36, Gomel; Nikolai K. Myshkin, ulitsa Kozhara, 5, kv. 36, Gomel, all of U.S.S.R.

[21] Appl. No.: 293,773

[22] Filed: Aug. 18, 1981

[51] Int. Cl.³ .............................................. C10M 7/10
[52] U.S. Cl. .................................... 252/12; 252/12.2; 252/12.4; 252/12.6
[58] Field of Search ...................... 252/12, 12.2, 12.4, 252/12.6

[56] References Cited

U.S. PATENT DOCUMENTS

| | | | |
|---|---|---|---|
| 3,455,023 | 7/1969 | Fawzy | 29/630 |
| 3,953,343 | 4/1976 | Sliney | 252/12 |
| 4,000,982 | 1/1977 | Ueda | 252/12 |
| 4,004,889 | 1/1977 | Gale et al. | 29/182.2 |
| 4,056,365 | 11/1977 | Bevington et al. | 428/565 |
| 4,096,075 | 1/1978 | Nakamura | 252/12 |
| 4,312,772 | 1/1982 | Mori | 252/12 |

FOREIGN PATENT DOCUMENTS

| | | |
|---|---|---|
| 1114061 | 5/1968 | United Kingdom . |
| 1486011 | 9/1977 | United Kingdom . |
| 312314 | 10/1971 | U.S.S.R. . |
| 347845 | 8/1972 | U.S.S.R. . |
| 419318 | 7/1974 | U.S.S.R. . |
| 589076 | 1/1978 | U.S.S.R. . |

OTHER PUBLICATIONS

Glacier DU and Glacier DX, The Glacier Metal Company Limited, pp. 1 to 8, 1977.

*Primary Examiner*—Jacqueline V. Howard
*Attorney, Agent, or Firm*—Ladas & Parry

[57] ABSTRACT

The composite self-lubricating material according to the present invention comprises a metal matrix containing functional additives; the matrix is formed by two components, one forming shells of the functional additives, the other being located in the spaces between the shells.

12 Claims, 4 Drawing Figures

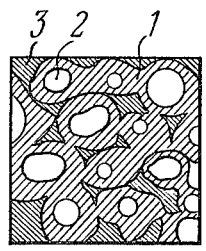 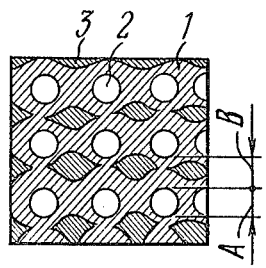
FIG.1     FIG.2
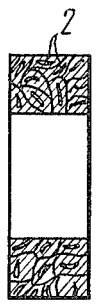     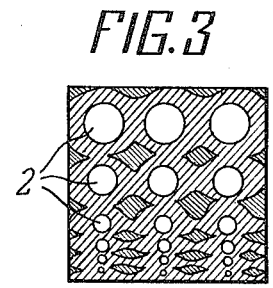
FIG.4     FIG.3

COMPOSITE SELF-LUBRICATING MATERIAL

The present invention relates to composite self-lubricating materials and, more specifically, to composite self-lubricating materials of tribo-engineering applications.

FIELD OF THE INVENTION

These materials find an extensive use in mechanical engineering, electrical engineering, electronics, in particular for the manufacture of sliding electric contacts, plain bearings to be operated under extreme conditions: vacuum, high and low temperatures, electric fields, mechanical overloads, etc.

BACKGROUND OF THE INVENTION

To ensure a reliable operation under the above-mentioned conditions, composite self-lubricating materials should meet the following requirements:

they should have a high mechanical strength at high and low temperatures, under thermal shocks;

they should be sufficiently corrosion-resistant under the conditions of high humidity and elevated temperature, radiation-resistant;

they should be stable in operation: have a low friction coefficient, low wear intensity, long life and reliable operation;

they have to be processable in the manufacture, assembling, servicing.

Furthermore, for such materials to be operated under the conditions of electrical fields an important factor is the stability of electrical characteristics of these materials, e.g. level of pulsation thereof, contact resistance, etc.

Known in the art are various mating parts of friction units of composite self-lubricating materials manufactured by methods of powder metallurgy: bearings containing metals such as copper, iron, brass and functional additives (cf. USSR Inventor's Certificates Nos. 144015 B-1, 1962, 158824 B-22, 1963, 160298 B-3, 1964; 419318 Cl. B 22 f 3/12; 568076 Cl. B 22 f 3/12, C 22 c 1/04; British patent application No. 1,483,328 Cl. B 22 f 7/04, F 16 33/06; U.S. Pat. Nos. 4,004,889 Cl. B 22 f 7/04, 4,049,428 Cl. B 22 f 1/02; Japanese Patent Application Nos. 52-15241, Cl. B 22 f 5/26, 52-2604 Cl. B 22 f 3/34, 52-26737 Cl. B 22 c 9/02 and others).

Also known are electrical brushes for electric motors manufactured from composite self-lubricating materials containing metals such as silver, copper and functional additives (cf. USSR Inventor's Certificates Nos. 312314 Cl. C 22 c 5/00, 599228 Cl. B 22 f; U.S. Pat. Nos. 2,418,710, 1944; 2,854,597, 1955; 3,437,592 Cl. 252-12, No. 3,455,023 Cl. H01r 4,056,365 Cl. B 22 f 3/00; French Patent Nos. 1,203,011; Cl. H 02 k, 1,306,535 Cl. H 02 k; 1,392,967 Cl. H 02 f; FRG Patent Nos. 1,215,938 Cl. 40 B 5/00, 2,712,209 Cl. B 22 f 5/00, No. 2,715,347, Cl. B 22 f 5/00) and other articles.

As the functional additives use is made of:
1. polymers:
thermostable ones: nitrogen—or phosphorous-containing (U.S. Patent No. 4,045,400 Cl. C 08 k 3/30, 9/02), epoxy (British Patent Appl. No. 1,479,402 Cl. C 08 G 59/11) and others;

organic binders (cf. French Appl. Nos. 2,377,750 and 2,337,751 Cl. C 08 L 53/00; B 22 f 3/00, C 04 B 35/64);
2. fibres:
graphite, synthetic materials, metals (both oriented and not with a size of from 1 to 100 $\mu$nm in an amount of from 20 to 80% by volume), e.g. FRG Patent No. 1,783,124 Cl. 4 OB 1/10, C 22 c 1/10;

3. oxides of metals, e.g. cadmium oxide (British patent application No. 1,486,011 Cl. C 08 L 27/18);

4. metals (Fe, Ni, Ag, Pb, Cd, In, Al), metal carbides (WC, FeC), oxide components (1–20%) e.g. osmium tetraoxide contained mainly in a solid solution with the basic component (cf. U.S. Pat. No. 3,370,942 Cl. C 22 c; FRG Pat. No. 1,249,536 Cl. 40 c 5/00;

5. lubricants:
antifriction corrosion-resistant solid lubricants based on a thermosetting resin, as well as graphite, molybdenum disulphide, zinc chromate or metals: cadmium, silver, tungsten (U.S. Pat. No. 3,051,586 Cl. 117–49);

high-temperature lubricants containing lubricating agents (molybdenum disulphide, boron nitride or graphite), metals (copper, zinc, indium or lead) and cadmium oxide with a particle size of not more than 10 $\mu$m (cf. French Pat. No. 1,345,589 Cl. C 01 m);

based on polymers such as products of condensation of an aromatic epoxy resin in an amount of from 15 to 60% by weight, solid lubricants in an amount of from 40 to 85% by weight, graphite, oxides of metals (cf. FRG Pat. No. 1,271,875 Cl. c 1/01 23, C 01 m);

diselenides of transition metals (tantalum diselenide, tantalum sulphide, niobium diselenide and mixtures thereof) for operation in a high vacuum of the order of below $10^{-7}$ torr (cf. FRG Pat. No. 1,284,017 Cl. C 10 m).

Composite self-lubricating materials, for example electrically conducting ones, are produced mainly by methods of power metallurgy, in particular by the solid-phase sintering method.

Known in the art is a composite self-lubricating material (cf. USSR Inventor's Certificate No. 347845, Cl. H 01 r 39/20) employed for the manufacture of electric brushes operating mainly in a high vacuum at negative temperatures. To improve operation characteristics, into the material containing metallized carbon powder, particles of an antifriction agent and a binder, metallized molybdenum disulphide is additionally introduced in an amount of from 40 to 70% by weight; molybdenum disulphide per se contains 30 to 50% by weight of the metal. As an example the following composition is described: 50% by weight of natural copper-coated graphite, 50% of copper-clad molybdenum disulphide containing 30% by weight of copper, as well as resol-type phenol-formaldehyde resin in the amount of 20% by weight.

Electric brushes manufactured from this material by hot compression-moulding have the following characteristics: volume resistivity 2.5–2.8 Ohm.mm$^2$/m. hardness 33–43 kgf/mm$^2$, transition voltage drop per pair of brushes (copper ring)—1.3–1.4 V. Wear in vacuum of $4.10^{-6}$ torr at the temperature of $-75°$ C. for 30 hours is 0.02 mm.

From the above-given data it follows that, despite the whole range of merits, namely high wear-resistance in vacuum, erosion resistance, a low friction coefficient, the above-described material possesses properties which do not enable its full use under extreme operation conditions:

presence of a filler, though ensuring lowered friction coefficient, impairs other properties such as vibration and impact-resistance;

the material has a low mechanical strength, e.g. upon compression due to the fact that a greater portion of a mechanical load borne by the material is distributed over the interface metal-filler. The adhesion strength in the contact metal-filler is rather low, which is due to the procedure of manufacture of the material;

a high transition voltage drop in the contact: electric brush-collector is responsible for electric losses, noises, high current fluctuations;

impaired operation performances of the material after a long storage period (10 days and longer) in the static state and under high humidity conditions (98%) and elevated temperature of 40° C. In this case there is observed "sticking" of the material to the metallic mating body, e.g. copper one. At the same time, electric resistance in the contact electric brush-collector is sharply increased and the voltage of the electric machine starting is inadmissibly increased by as much as 3 to 5 times.

Due to the above-mentioned reasons the material has a low operation reliability.

Known in the art is a number of composite self-lubricating materials based on a metal matrix, which possess higher service characteristics.

A material of such type is known, which consists of a porous bronze matrix formed by sintering of metal powders so that in pores of the metal matrix functional additives are present, for example polytetrafluorethylene (cf. F. P. Bowden, Frictional Properties of Porous Metals Impregnated with Plastics—Research, 1950, v.3, p.147).

There is also known another composite self-lubricating material for strip bearings (British Pat. No. 1,114,061; B 912121, 756950).

The material comprises a porous metal matrix with a pore volume of up to 35%, randomly filled with functional additives. As the matrix use is made of metals such as high tin-content bronze, while as the functional additives polytetrafluorethylene and lead are used. The material is produced by methods of powder metallurgy, for example by sintering, from the electrolytically produced dendrite powders of pure metals of spherical particles of powder of high tin-content bronze containing up to 10% by weight of tin. The process for the manufacture of such materials involves: high-temperature compression of the powder, its preliminary sintering in a reducing atmosphere to a semi-finished product, repeated impregnation of this semi-finished article with a suspension of functional additives, final sintering of the impregnated semi-finished article, e.g. together with the steel base, in an inert medium and calibration of the resulting article by plastic deformation (upsetting). In the case of manufacturing articles from this materials, e.g. strip bearings, it is necessary that at the stage of impregnation of the matrix with functional additives the latter be extending above the article surface as a layer with a thickness of about 0.02 mm, which is an indispensable condition for a high operability of the bearing.

The materials are produced as strips with a thickness of 1.21 to 3.05 mm and width of up to 101.6 mm; bushings with a diameter of 10 to 100 mm, semi-spherical supports with a diameter of from 16 to 38 mm, wire, bearings, etc. The material is employed under the conditions of dry and semi-liquid friction.

These materials possess a high operability (low wear intensity and low friction coefficient) including that under heavy loads, without lubrication within a wide temperature range (from −200 to +260° C.) in the air and other gas media, in vacuum, as well as in liquid media possessing no lubricating effect. No static charges are formed on these materials; neither they cause fretting corrosion.

One of the advantages of these materials resides in the feasibility of using them in friction units operating under extreme conditions.

It is known that these materials are used as cage members of ball bearings made of sintered silver impregnated with polytetrafluorethylene with addition of a small amount of tungsten diselenide which successfully operate at low and high temperatures in a high vacuum of from $10^{-7}$ to $10^{-9}$ torr. The materials find extensive use in the following industries: aviation and space engineering, automobile industry, electrical engineering, textile and other industries.

The material, however, has a limited range of applications due to the fact that (a) not all pores in the material are uniformly impregnated, since they differ in size, position and, hence, during the operation of the material, lubrication stock in the pores adjacent, at the moment, to the friction surface, is exhausted;

(b) pores may become clogged due to contamination thereof with the products of wear, foreign matter, as well as due to plastic deformation of superficial layers of the matrix, e.g. at high loads and temperatures;

(c) service characteristics of the material depend on its physico-mechanical, frictional and other characteristics within the contact microareas. The same characteristic may have different values within different areas and vary within a wide range;

(d) adhesion interaction between the functional additive (polytetrafluoroethylene is chemically inert to metals) and the metal matrix during impregnation is rather insignificant. This lowers mechanical strength characteristics of the material and, eventually, impairs numerous final characteristics such as wear-resistance in vacuum, vibration-and impact-resistance, electrical conductivity and the like, i.e. reliability;

(e) the material has a low thermal stability (up to +280° C.) due to destruction of polytetrafluoroethylene;

(f) the material has a low resistance to irradiation in air due to destruction of the binder;

(g) the procedure for the manufacture of the material requires a whole range of auxiliary operations: intimate intermixing, repeated impregnation, multiple compression-moulding and sintering of metal powders, a plurality of finishing operations: calibration, complicated stepwise thermal treatment, polishing, and the like.

BRIEF SUMMARY OF THE INVENTION

It is an object of the present invention to provide such a composite self-lubricating material which would possess improved service characteristics under the conditions of vacuum, high and low temperatures, electric and force fields, and be reliable in operation.

These and other objects are accomplished by that in the composite self-lubricating material according to the present invention comprising a metal matrix containing functional additives, in accordance with the present invention the matrix is formed by two components, one forming shells of the functional additives and the other being located in the spaces between these shells.

As the matrix components use is made of both pure metals, such as silver, copper, barium, aluminium, tungsten, tin, and metal alloys, such as bronze, while as the functional additives use is made of substances of both organic and inorganic origin.

Such substances may be polymers, solid lubricants such as graphite, diselenides of transition metals. The choice and combination of the metal components are effected with due account of the physico-mechanical characteristics of the metals and/or alloys. The specific combination of the components contributes to the formation of the above-described structure of the material. This structure can make it possible to obtain a material possessing high antifriction, electric conductance and mechanical-strength characteristics. The component which forms shells for the functional additives acts mainly as a structural agent, i.e. it forms the space skeleton of the matrix. The second component, filling the spaces between the shells, in combination with the functional additives, ensures a self-lubrication effect upon friction and enhances mechanical strength of the matrix. The matrix of the composite self-lubricating material comprises, generally, both a regular and irregular structure.

To improve the service characteristics of the composite self-lubricating material according to the present invention, it is preferable that the above-mentioned shells would form a regular cellular structure.

In operation of the material an important factor is stability of its service characteristics at the contact surface. This is ensured by the appropriate adjustment of the composition and structure of the material, in particular, by the presence of finely-divided components and additives at the contact surface. For this reason, it is advisable to have shells with a regular cellular structure and with the size of the cells diminishing in the direction towards the surface of contact of the material with the mating body.

As has been mentioned hereinabove, as the components of the matrix use is made of both pure metals and alloys thereof. It is advisable, for the manufacture of parts for triboelectric applications, to make use of metals pertaining to Periods III-VI of the Periodic System and/or alloys of these metals.

The use of rare-earth metals, lanthanides, actinoids is economically inefficient. As the matrix of the material according to the present invention it is advisable to use metals of III-VI Periods of the Periodic System, for example silver, copper, barium, lead, molybdenum, tungsten and/or alloys thereof, e.g. an alloy of silver and copper, lead and barium. To obtain the above-described structure of the material it is necessary that the melting point of the second component be at most 0.9 of the melting point of the second component. Inobservance of this condition will result in a random rearrangement of the components in the matrix, thus impairing the service characteristics, in particular, stability of the friction coefficient, electrical contact characteristics.

Depending on the purpose of the composite self-lubticating material, the amount of functional additives may be different and vary within the range of from 3 to 80% by volume. The lower limit of this range (3 vol. %) is the minimal amount still providing for the self-lubrication effect upon friction. With the content of the above-mentioned functional additives above the specified upper limit (80% by volume) the above-described structure of the material is disturbed. This results in an inadmissible deterioration of the mechanical strength, electrical conductivity and other properties of the material.

The particle size of functional additives plays an important role in operation of the material; it determines durability and reliability of the friction unit and, moreover, stability of contact characteristics. The distribution of the functional additives in the matrix should be effected in such a manner that the distance between the additives, i.e. the shell thickness, would ensure the retaining of the above-described structure and cause no deterioration of the service characteristics.

An important criterion for the evaluation of the structure of the material is the ratio of the maximum particle size of the functional additives to the minimal distance therebetween. In principle, this ratio may be of any value, though it is advisable that this ratio be varied within the range of from 0.7 to 10.

A functional additives it is desirable to use thermosetting or thermoplastic polymers. As thermosetting polymers it is advisable to use resins: phenolformaldehyde, glass-filled epoxy or polyimide resin; as thermoplastic polymers-polyethylene, oil-extended polycaproamide, polytetrafluoroethylene.

A high effect of self-lubrication in friction is achieved with the use, as functional additives, of powder-like products of thermal or thermal oxidation destruction of thermosetting or thermoplastic polymers. As the products of thermal destruction carried out in a non-oxidizing medium, e.g. in vacuum, use is made, for example, of polyethylene, phenol-formaldehyde resin; as the products of thermal oxidation destruction carried out in air use is made of polycaproamide, epoxy or polyimide resins.

It is advisable to use the destruction products of polymers obtained upon decomposition of at least 90% by weight of the polymer.

In the use of the composite self-lubricating material according to the present invention at elevated temperatures, in electric field, under high mechanical overloads, ionizing radiations, this material should have reliable physico-mechanical properties, in particular, electrical conductivity characteristics. In this case it is desirable to incorporate into the material composition as functional additives, powders of metals of III-VI Periods of the Periodic System or their oxides, e.g. silver, copper, cadmium, tungsten, as well as their basic oxides such as copper dioxide, silver oxide. It is also advisable to use them in an amount varying within the range of from 0.5 to 45% by volume of the total amount of the functional additives.

In order to improve mechanical strength characteristics, in particular, specific mechanical strength, it is necessary to use functional additives possessing high mechanical strength characteristics. As such additives it is preferable to use high-strength fibres of boron, carbon or silicon. Incorporation thereof into the material also results in a sharp elevation of its wear-resistance and thermal strength. It is advisable to incorporate these additives into the material in an amount of from 2 to 90% of the total volume of the functional additives. The introduction of the additives in an amount below 2% by volume does not substantially improve the service characteristics of the material, whereas the amount of the additives above 90% by volume impairs the self-lubricating effect despite the high wear-resistance of the material. In this case an intolerable wear of the mating body takes place.

Improvement in the mechanical-strength characteristics of the composlite self-lubricating material simultaneously with improvement in the electrical conductivity and thermal conductivity of the material are achieved by incorporation of metals of III–VI Periods of the Periodic System in the form of whiskers in an amount of from 2 to 90% of the total volume of the functional additives. The introduction of the additives in an amount below 2% by volume does not substantially improve the service characteristics of the material, while their amount exceeding 90% by volume hinders the manifestation of the self-lubrication effect, lowers the service life and reliability of the friction couple.

The composite self-lubricating material according to the present invention has a whole set of required service characteristics: self-lubrication under extreme conditions, high physico-mechanical characteristics, reliability and long time of stable operation.

The basic advantage of the material according to the present invention resides in its high operability under extreme conditions, thus ensuring a long service life and reliability of triboengineering-application parts in friction assemblies. Thus, self-lubrication and mechanical-strength characteristics of the material according to the present invention are substantially (1.5-2 times) higher than those of the prior art materials.

The material according to the present invention may be most efficiently used in mechanical engineering, electrical engineering, electronics for the manufacture of sliding electric contact members, plain bearings to be operated under normal climatic conditions, in vacuum, at high and low temperatures, in electric fields, under mechanical overloads and ionizing radiations. DR The present invention is further illustrated by the description of specific embodiments thereof with reference to the accompanying drawings, wherein:

FIG. 1 shows a cross-sectional view of the composite self-lubricating material according to the invention;

FIG. 2 is a cross-sectional view of the composite self-lubricating material with a regular cellular structure;

FIG. 3 is a cross-sectional view of the composite self-lubricating material perpendicular to the working surface of the mating body;

FIG. 4 is a diametral cross-section of a bearing manufactured from the composite self-lubricating material according to the present invention.

An embodiment of the cross-section of the composite self-lubricating material shown in FIG. 1 comprises a metal matrix formed by two components; one of the components, shown at 1 forms shells of functional additives 2; the other component, shown at 3 is located in spaces between the shells.

Shown in FIG. 2 is a cross-section of a composite self-lubricating material with a regular cellular structure; the ratio of the maximum particle size of additives A to the minimal distance therebetween B ranges from 0.7 to 10.

In FIG. 3 there is shown a cross-section of a composite self-lubricating material perpendicular to the working surface of the mating body; the shells of the regular cellular structure are made so that the cell size diminishes towards the surface of contact of the material with the mating body.

Shown in FIG. 4 is a diametral cross-section of a plain bearing made of a composite self-lubricating material according to the present invention, wherein as the functional additives use is made of metal whiskers and fibres.

DETAILED DESCRIPTION OF THE INVENTION

The process for the production of a composite self-lubricating material according to the present invention is simple and can be performed in the following manner.

The employed functional additives are twice metallized, for example, graphite particles are first coated with a silver layer, then with lead using one of the following preferable techniques: evaporation of metals in vacuum, chemical or electrochemical deposition. In doing so, an important factor is compatibility, uniformity and thickness of coatings, as well as the size and shape of the metallized functional additives.

The thus-made prefabricate is compression-moulded and then sintered under a pressing load in a controlled neutral or reducing medium under optimal conditions of sintering metals as used in the powder metallurgy.

At the initial stage of the process of sintering the outer layer of a more easily-melting metal is molten and fills the spaces between the shells of a more refractory metal component. Thereafter (under the conditions of pressing load) there occurs mutual approaching of the shells of the functional additives and sintering thereof in the contact zone.

After stopping of sintering there occurs crystallization of the matrix components. As a result, the material matrix is formed by two components, one component forming shells of the functional additives, and the other filling the spaces between the shells. In the case of using the functional additives with particles of the same volume the material has a regular cellular structure.

For a better understanding of the present invention, some specific examples are given hereinbelow by way of illustration.

EXAMPLE 1

The starting product—graphite particles with a size of up to 50 $\mu$m are electrolytically coated with a layer of copper and then of lead. The thus-coated graphite particles are blended with tin powder in the amount of 30% by volume of the total volume of graphite and compression-moulded in a mould under a specific pressure of up to 400 MPa. Then the prefabricate is sintered in a mould in the presence of a pressing load in the atmosphere of hydrogen at the temperature equal to 0.7 of the melting point of silver (530°-540° C.) for three hours. The content of graphite in the material is 3% by volume.

From the thus-produced material there are manufactured electrical brushes, for example for micro electric motors. The material has an irregular structure; its characteristics are given in Table 1 hereinbelow.

EXAMPLE 2

The composite self-lubricating material consists of a matrix formed by two components; one of them—magnesium—forms shells of the functional additives employed, while the second—indium-tin alloy—is located in the spaces between the shells. As the functional additives use is made of a powder-like thermoplastic polymer—polyethylene in the amount of 80% by volume. The material has a regular structure. It can be employed for plain bearings.

EXAMPLE 3

The composite self-lubricating material consists of a matrix formed by two component; one—molybdenum—forms shells of the functional additives; the second—bronze—is located in the spaces between the shells. As the functional additives use in made of a powder-like glass-filled epoxy resin in the amount of 40 vol.% added with copper powder in the amount of 0.5% by volume of the functional additive. The material has an irregular structure and can be used for the manufacture of parts for triboengineering applications.

EXAMPLE 4

The composite self-lubricating material consists of a matrix formed by two components, one of these components—brass—forms shells of the functional additives and the other—potassium—fills the spaces between the shells. As the functional additives use is made of a thermoplastic polymer—polycaproamide—in the amount of 3% by volume. The material has a regular structure and can be used for the manufacture of articles having triboengineering applications.

EXAMPLE 5

The composite self-lubricating material consists of a matrix formed by two components, one of which—copper—forms shells of the functional additives and the other—cadmium—is located in the spaces between the shells. As the functional additives use is made of oil-extended polycaproamide in the amount of 45% by volume with the addition of barium oxide powder in the amount of 5% of the volume of the functional additive. The material has an irregular structure and can be employed for the manufacture of parts for triboengineering applications.

EXAMPLE 6

The composite self-lubricating material comprises a matrix formed by two components, one of them—silver—forming shells of the functional additives and the other—indium—being located in the spaces between the shells. As the functional additives use is made of a mixture of the products of thermal destruction of polyethylene and a phenolformaldehyde resin in the amount of 20% by volume. The material has a regular structure and can be used for the manufacture of cages for antifriction bearings.

EXAMPLE 7

The composite self-lubricating material consists of a matrix formed by two components, one—vanadium—forming shells of the functional additives and the other—calcium-being located within the spaces between the shells. As the functional additives use is made of a mixture of products of joint thermal oxidation destruction of polycaproamide and polyimide resin in the amount of 55% by volume. The material has a regular structure and can be used for the manufacture of parts for triboengineering applications.

EXAMPLE 8

The composite self-lubricating material consists of a matrix formed by two components, one of the components-rhenium—forming shells of the functional additives, while the other—stainless steel—fills the spaces between the shells. The shells form a regular cellular structure and are made with the cell size diminishing towards the surface of the contact of the material and the mating body. As the functional additives use is made of silver powder in the amount of 45% by volume, the ratio of the maximum particle size of the additives to the minimal distance therebetween is equal to 0.7. The material can be employed for the manufacture of electric brushes or contact rings.

EXAMPLE 9

The composite self-lubricating material consists of a matrix formed by two components, one—an alloy of silver with copper—forming shells of the functional additives, the other—lead—being located in the spaces between the shells. As the functional additives use is made of molybdenum disulphide in the amount of 10% by volume, the ratio of the maximum particle size of the additive to the minimal distance therebetween is 5.5. The material has a regular structure and can be used for the manufacture of sliding electrical contact members.

EXAMPLE 10

The composite self-lubricating material consists of a matrix formed by two components, one—aluminum—forming shells of the functional additives, the other—cadmium—being located in the spaces between the shells. As the functional additives use is made of boron nitride in the amount of 20% by volume, the ratio of the maximum particle size to the minimum distance between the shells of the additives is equal to 10. The material has a regular structure and can be used for the manufacture of plain bearings.

EXAMPLE 11

The composite self-lubricating material consists of a matrix formed by two components, one—nickel—forming shells of the functional additives, the other—copper—being located in the spaces therebetween. As the functional additives use is made of boron nitride in the amount of 20% by volume with the addition of a mixture of fibres of silicon and boron in the amount of 2% by volume of the total amount of the functional additives. The material has an irregular structure and can be used for the manufacture of parts for triboengineering applications.

EXAMPLE 12

The composite self-lubricating material consists of a matrix formed by two components, one—chromium—forming shells of the functional additives and the other—cadmium—being located within the spaces between the shells. As the functional additives use is made of graphite in the amount of 15% by volume with addition of whiskers of tantalum in the amount of 40% by volume of the total amount of the functional additives. The material has an irregular structure and can be used for the manufacture of heat-resistant parts for triboengineering applications.

EXAMPLE 13

The composite self-lubricating material consists of a matrix formed by two components, one—rhenium—forming shells of the functional additives, the other—silver-being located in the spaces between the shells. As the functional additives use is made of molybdenum disulphide in the amount of 30% by volume with the addition of carbon fibres in the amount of 90% of the total volume of the functional additives. The material has an irregular structure and can be used for the manufacture of electrical brushes.

Properties of the composite self-lubricating materials according to the present invention are shown in Table 1. In Table 2 the properties of prior-art composite self-lubricating materials are presented.

TABLE 1

Properties of the composite self-lubricating material

Physico-mechanical properties

| | Composition of the composite self-lubricating material | Density, g/cm³ | Mean hardness kgf/mm² | Ultimate compression strength, kgf/mm² |
|---|---|---|---|---|
| 1 | 2 | 3 | 4 | 5 |
| 1. | Composite self-lubricating material containing porous metal matrix of high-tin bronze with its pores impregnated with polytetrafluoroethylene and lead | 6.5–7.0 | 12–16 | 30–40 |
| 2. | Example 1 | 3.5–4.5 | 7–10 | 12–20 |
| 3. | Example 2 | 4.0–6.0 | 14–18 | 17–22 |
| 4. | Example 3 | 4.0–4.5 | 7–9 | 30–40 |
| 5. | Example 4 | 4.0–5.5 | 10–14 | 15–20 |
| 6. | Example 5 | 3.8–6.2 | 8–12 | 18–22 |
| 7. | Example 6 | 5.5–6.0 | 17–21 | 15–20 |
| 8. | Example 7 | 4.5–6.0 | 18–26 | 15–20 |
| 9. | Example 8 | 3.5–5.5 | 12–18 | 35–45 |
| 10. | Example 9 | 3.0–4.5 | 8–14 | 12–20 |
| 11. | Example 10 | 4.0–6.0 | 20–28 | 15–18 |
| 12. | Example 11 | 5.0–8.0 | 25–35 | 40–60 |
| 13. | Example 12 | 4.0–6.0 | 25–30 | 40–55 |
| 14. | Example 13 | | | 20–30 |

Friction properties

| | Volume resistivity, Ohm·mm²/m | Wear intensity air 20° C. | Wear intensity air 80° C. | Wear intensity vacuum 20° C. | Friction coefficient $10^{-5}$ torr $-65$° C. | Friction coefficient $10^{-5}$ torr | Friction coefficient air 20° C. | Friction coefficient in vacuum 20° C. |
|---|---|---|---|---|---|---|---|---|
| | 6 | 7 | 8 | 9 | 10 | 11 | 12 | |
| 1. | | $(0.03$–$0.06) \times 10^{-8}$ | | | | $0.04$–$0.20$ | | |
| 2. | $0.05$–$0.12$ | $(2$–$8) \times 10^{-11}$ | $(8$–$12) \times 10^{-10}$ | $(4$–$6) \times 10^{-10}$ | | $0.08$–$0.12$ | $0.15$–$0.20$ | |
| 3. | $0.10$–$0.25$ | $(1$–$4) \times 10^{-11}$ | | $(6$–$8) \times 10^{-11}$ | $(1$–$3) \times 10^{-10}$ | $0.06$–$0.08$ | $0.10$–$0.20$ | |
| 4. | | $(6$–$8) \times 10^{-11}$ | $(1$–$2) \times 10^{-9}$ | | | $0.12$–$0.25$ | $0.15$–$0.25$ | |
| 5. | | $(6$–$8) \times 10^{-11}$ | $(8$–$9) \times 10^{-10}$ | | | $0.10$–$0.20$ | | |
| 6. | | $(1$–$4) \times 10^{-11}$ | $(8$–$10) \times 10^{-11}$ | $(2$–$6) \times 10^{-10}$ | $(8$–$10) \times 10^{-10}$ | $0.04$–$0.08$ | $0.12$–$0.15$ | |
| 7. | | $(1$–$2) \times 10^{-10}$ | | $(3$–$4) \times 10^{-10}$ | | $0.04$–$0.06$ | $0.08$–$0.12$ | |
| 8. | $0.08$–$0.20$ | $(2$–$4) \times 10^{-10}$ | $(6$–$8) \times 10^{-10}$ | $(1$–$2) \times 10^{-11}$ | | $0.10$–$0.20$ | | |
| 9. | 10–15 | $(4$–$6) \times 10^{-11}$ | | $(3$–$5) \times 10^{-11}$ | | $0.12$–$0.22$ | $0.18$–$0.22$ | |
| 10. | | $(6$–$8) \times 10^{-10}$ | $(4$–$6) \times 10^{-10}$ | $(4$–$6) \times 10^{-10}$ | $(5$–$7) \times 10^{-10}$ | | $0.10$–$0.12$ | |
| 11. | | $(7$–$9) \times 10^{-10}$ | $(1$–$2) \times 10^{-11}$ | | | $0.15$–$0.20$ | | |
| 12. | | $(0.3$–$0.6) \times 10^{-11}$ | $(0.4$–$0.6) \times 10^{-10}$ | | | $0.10$–$0.20$ | | |
| 13. | $1.0$–$8.0$ | $(4$–$8) \times 10^{-11}$ | $(6$–$8) \times 10^{-11}$ | $(2$–$3) \times 10^{-11}$ | $(3$–$4) \times 10^{-11}$ | $0.15$–$0.25$ | | |
| 14. | | | | | | $0.08$–$0.12$ | $0.12$–$0.15$ | |

Electrical properties / Ranges of permissible working characteristics

| | Composition of the composite self-lubricating material | Transition voltage drop across the contact, V in vacuum 20° C. | Transition voltage drop across the contact, V in air 20° C. | Percentage of increased value of starting voltage of micromotors after keeping at 98% humidity at 40° C. for 21 days | Speed, m/s | Load, kgf/cm² | Temperature °C. | Vibration load | Current density A/cm² |
|---|---|---|---|---|---|---|---|---|---|
| 1 | 2 | 13 | 14 | 15 | 16 | 17 | 18 | 19 | 20 | 21 |
| 1. | Composite self-lubricating material containing porous metal matrix of high-tin bronze with its pores impregnated with polytetrafluoroethylene and lead | | | | | $0.25$–$2.5$ | $2.0$–$1400$ | $-260$–$+200$ | | |
| 2. | Example 1 | $0.3$–$0.5$ | $0.2$–$0.3$ | 20 | | $0.25$–$2.5$ | $0.1$–$5.0$ | $-260$–$+150$ | 40–55 | 80–120 |

TABLE 1-continued

Properties of the composite self-lubricating material

| | | | | | | | |
|---|---|---|---|---|---|---|---|
| 3. | Example 2 | | | | 0.10-15 | 0.3-25 | -70-+80 | |
| 4. | Example 3 | | | | 0.1-25 | 1.0-150 | -50-+160 | 20-60 |
| 5. | Example 4 | | | | 1-100 | 1-10 | -50-+60 | |
| 6. | Example 5 | | | | 0.25-5.5 | 1-8 | | |
| 7. | Example 6 | | | | 0.25-2.5 | 0.1-2.0 | 50-+60 | |
| 8. | Example 7 | | | | 0.5-15 | 0.7-125 | -50-+40 | |
| 9. | Example 8 | 0.08-0.15 | 0.06-0.10 | | 0.25-2.5 | 0.1-1.0 | -260-+150 | 20-40 | 6-20 |
| 10. | Example 9 | 0.10-0.30 | | 10 | 0.1-2.0 | 0.1-1.5 | -80-+80 | | 6-50 |
| 11. | Example 10 | | | | 1.0-25 | 1.0-40 | -150-+200 | 10-20 |
| 12. | Example 11 | | | | 5.0 100 | 4-250 | -260-+300 | 40-80 |
| 13. | Example 12 | | 0.10-0.30 | | 2-150 | 1-500 | -260-+300 | 20-40 |
| 14. | Example 13 | 0.15-0.30 | | 15 | 0.05-4.0 | 0.2-2.0 | -260-+360 | 10-20 | 10-150 |

What is claimed is:

1. A composite self-lubricating material comprising a metal matrix incorporating functional additives, the matrix being formed by two components each selected from the group consisting of metals of Periods III–VI of the Periodic System and alloys thereof, the first component forming shells of regular cellular structure around the functional additives and the second component being located in the spaces between the shells.

2. A composite self-lubricating material accroding to claim 1, wherein the shells forming a regular cellular structure are made with the size of the shells decreasing in the direction towards the surface of contact of the material with the mating body.

3. A composite self-lubricating material according to claim 1, wherein the melting point of the second component is at most 0.9 of the melting point of the first component.

4. A composite self-lubricating material according to claim 1, wherein the functional additives are contained in an amount of from 3 to 80% by volume, the ratio between the maximum particle size of the additives and the minimal distance therebetween being equal to 0.7–10.

5. A composite self-lubricating material according to claim 1, wherein as the functional additives use is made of polymers selected from the group consisting of thermosetting and thermoplastic polymers.

6. A composite self-lubricating material according to claim 5, wherein as the thermosetting polymers use is made of polymers selected from phenolformaldehyde, glass-filled epoxy and polyimide resins.

7. A composite self-lubricating material according to claim 5, wherein as the thermoplastic polymers use is made of the ploymers selected from polyethylene, oil-extended polycaproamide and polytetrafluoroethylene.

8. A composite self-lubricating material according to claim 1, wherein as the functional additives use is made of powder-like products of thermal destruction of polymers selected from the group consisting of thermosetting and thermoplastic materials.

9. A composite self-lubricating material according to claim 1, wherein as the functional additives use is made of powder-like products of thermal oxidation destruction of polymers selected from the group of thermosetting and thermoplastic polymers.

10. A composite self-lubricating material according to claim 1, wherein as the functional additives it also incorporates powders of the components selected from metals of III–VI Periods of the Periodic System and oxides of these metals in an amount of from 0.5 to 45% by volume of the total volume of the functional additives.

11. A composite self-lubricating material according to claim 1, wherein as the functional additives use is also made of substances selected from the group consisting of boron, carbon and silicon in the form of fibres in an amount ranging from 2 to 90% of the total volume of the functional additives.

12. A composite self-lubricating material according to claim 1, wherein as the functional additives use is also made of metals of III–VI Periods of the Periodic System in the form of whiskers in an amount of from 2 to 90% of the volume of the functional additives.

* * * * *